United States Patent [19]
Wiesbeck et al.

[11] Patent Number: 5,387,918
[45] Date of Patent: Feb. 7, 1995

[54] METHOD AND AN ARRANGEMENT FOR MEASURING DISTANCES USING THE REFLECTED BEAM PRINCIPLE

[75] Inventors: Werner Wiesbeck, Ellmendingen; Jürgen Kehrbeck, Ettlingen; Eberhardt Heidrich, Karlsruhe, all of Germany

[73] Assignee: Endress & Hauser GmbH & Co., Germany

[21] Appl. No.: 956,882
[22] PCT Filed: Apr. 15, 1992
[86] PCT No.: PCT/EP92/00848
 § 371 Date: Dec. 11, 1992
 § 102(e) Date: Dec. 11, 1992
[87] PCT Pub. No.: WO92/18876
 PCT Pub. Date: Oct. 29, 1992

[30] Foreign Application Priority Data
Apr. 18, 1991 [DE] Germany ............... 4112710

[51] Int. Cl.⁶ ............................................. G01S 13/32
[52] U.S. Cl. .................................................. 342/128
[58] Field of Search ....................... 342/128, 200, 122; 356/28.5, 28

[56] References Cited

U.S. PATENT DOCUMENTS

| 4,210,023 | 7/1980 | Sakamoto et al. | |
|---|---|---|---|
| 4,367,473 | 1/1983 | Marin et al. | 342/128 |
| 4,716,362 | 12/1987 | Ambos et al. | |
| 5,072,223 | 12/1991 | Hethuin et al. | |
| 5,189,427 | 2/1993 | Stove et al. | 342/128 |

FOREIGN PATENT DOCUMENTS

| 3203677 | 8/1983 | Germany . |
|---|---|---|
| 3615502 | 11/1987 | Germany . |
| 90/13049 | 11/1990 | WIPO . |

OTHER PUBLICATIONS

Frank J. Cerra, "Introduction to Radar Systems", McGraw-Hill, Inc., 1962, four pages.
Hermann Franks, "Lueger Lexikon der Technik", Deutsche Verlags-Anstalt GMBH, Stuttgart, 1969, p. 276.

*Primary Examiner*—Mark Hellner
*Attorney, Agent, or Firm*—Barnes & Thornburg

[57] ABSTRACT

For distance measurement using the reflected beam principle a transmission wave is transmitted with a periodically frequency modulated transmission frequency. The echo wave reflected at the target has a reception frequency which is periodically frequency modulated in the same manner, there being a transit time dependent frequency difference between the transmission frequency and the reception frequency, such frequency difference being the distance frequency which is determined as measure of the distance of the target from the transmission/reception location. Using a constant reference frequency the transmission frequency and the reception frequency are converted in a common mixer to give a transmission/reception intermediate frequencies mixture, which includes a transmission intermediate frequency formed by conversion of the transmission frequency using the reference frequency, and a reception intermediate frequency formed by conversion of the reception frequency using the reference frequency. The distance frequency is determined from the frequency difference between the transmission intermediate frequency and the reception intermediate frequency, and the transmission intermediate frequency comprised in the transmission reception intermediate frequencies mixture is utilized for correction of the frequency modulation of the transmission frequency. For this purpose the arrangement for implementing the method comprises a correction channel which is connected with the output of the common mixer parallel to the measurement channel.

12 Claims, 4 Drawing Sheets

METHOD AND AN ARRANGEMENT FOR MEASURING DISTANCES USING THE REFLECTED BEAM PRINCIPLE

The invention relates to a method for measuring distances using the reflected beam principle, in which on the basis of a periodically frequency modulated electrical transmission signal a transmission wave is transmitted with the frequency (named the transmission frequency) of the transmission signal, the echo wave reflected at a target is converted into an electrical reception signal with the frequency (named the reception frequency) of the echo wave, the transmission and the reception frequencies are converted, using a constant reference frequency and in a common mixer, into a transmission/reception intermediate frequencies mixture which contains a transmission intermediate frequency, formed by conversion of the transmission frequency using the reference frequency, and a reception intermediate frequency formed by conversion of the reception frequency using the reference frequency, and the transit time dependent frequency difference (named the distance frequency) between the transmission and the reception frequencies is determined, as a measure of the distance between the target and the transmission/reception location, from the frequency difference between the transmission intermediate frequency and the reception intermediate frequency, and to an arrangement for implementing the method.

A method of this type has been disclosed, see the German patent publication 3,203,677A1, which has certain advantages over methods, in which the distance frequency is determined directly by forming the difference between the transmission frequency and the reception frequency; since the transmission frequency and the reception frequency are very high and are very close to each other, the difference frequency found by direct establishment of the difference between these two frequencies is very much subject to noise, and this is not conducive to exact measurement of the distance. On the other hand the transmission and reception intermediate frequencies obtained by conversion using the reference frequency are in a lower frequency range, which is an advantage for further processing. The frequency difference between these two intermediate frequencies is again the desired distance frequency; it can be determined with simpler means and with a better accuracy by formation of the difference between these two lower frequencies and is substantially free of noise.

A further substantial condition for the correct measurement of distance using the already mentioned method is the exact maintenance of the waveform of the frequency modulation of the transmission frequency. Every departure from the predetermined waveform leads to errors of measurement. Thus for instance in the case of linear frequency modulation, the most frequently employed method, any departure from linearity in the modulation curve must be avoided. The PCT application WO 90/13049 discloses, in connection with an arrangement for distance measurement using the reflected beam method, the control of the frequency modulator by the signal processing circuit which also functions to determine the distance from the distance frequency. A correction of the frequency modulation is however impossible with this arrangement, since the signal processing circuit is only supplied with the distance frequency, which is directly produced by difference formation between the transmission frequency and the reception frequency and in which the information on the departures of the frequency modulation from the prescribed waveform is not included.

One object of the invention is to provide a method of the type initially mentioned, in the case of which exact adherence to the waveform of the frequency modulation of the transmission frequency is ensured.

This object is attained by the invention in that the transmission intermediate frequency comprised in the transmission/reception intermediate frequencies mixture is utilized for correction of the frequency modulation of the transmission frequency.

In the case of the invention advantage is taken of the fact that the transmission intermediate frequency included in the transmission/reception intermediate frequencies mixture will have the same departures from the prescribed waveform of the frequency modulation as the transmission frequency, albeit at a very much lower frequency level. Therefore it is possible to determine departures of the transmission frequency from the prescribed desired values for different points in time within a modulation period and to use them for forming correction values, with which the frequency modulation can be so corrected that the departures disappear. The determination of the departures at the comparatively low transmission intermediate frequency can be implemented with substantially less circuit complexity and with greater accuracy than is the case at the higher transmission frequency.

An arrangement for distance measurement on the basis of the reflected beam principle comprising a transmission signal generator for the production of a periodically frequency modulated transmision signal, at least one antenna for the transmission of a wave at the frequency (named the transmission frequency) of the transmission signal and for the reception of the echo wave reflected at a target, which is converted into a reception signal with the frequency (named the reception frequency) of the echo wave, a reference signal generator for the production of a reference signal with a constant frequency (named the reference frequency), a mixer which receives one signal at the transmission frequency, one signal at the reception frequency and the reference signal and produces a transmission/reception intermediate frequencies mixture as an output, which comprises a transmission intermediate frequency produced by conversion of the transmission frequency using the reference frequency and a reception intermediate frequency formed by conversion of the reception frequency using the reference frequency, and a measuring channel connected with the output of the mixer, in which the transit time dependent frequency difference (i. e. the distance frequency) between the transmission frequency and the reception frequency is determined as a measure for the distance between the target and the transmission/reception location from the frequency difference between the transmission intermediate frequency and the reception intermediate frequency, is in accordance with the invention characterized in that a correction channel is connected with the output of the mixer and parallel to the measuring channel, in which correction channel the transmission intermediate frequency, comprised in the transmission/reception intermediate frequencies mixture, is utilized for correction of the frequency modulation of the transmission frequency.

Some advantageous developments and modifications of the method and the arrangement in accordance with the invention are recited in the dependent claims.

Further details and advantages of the invention will be understood from the following detailed descriptive disclosure of one embodiment thereof in conjunction with the accompanying drawings, wherein.

Figure 1:
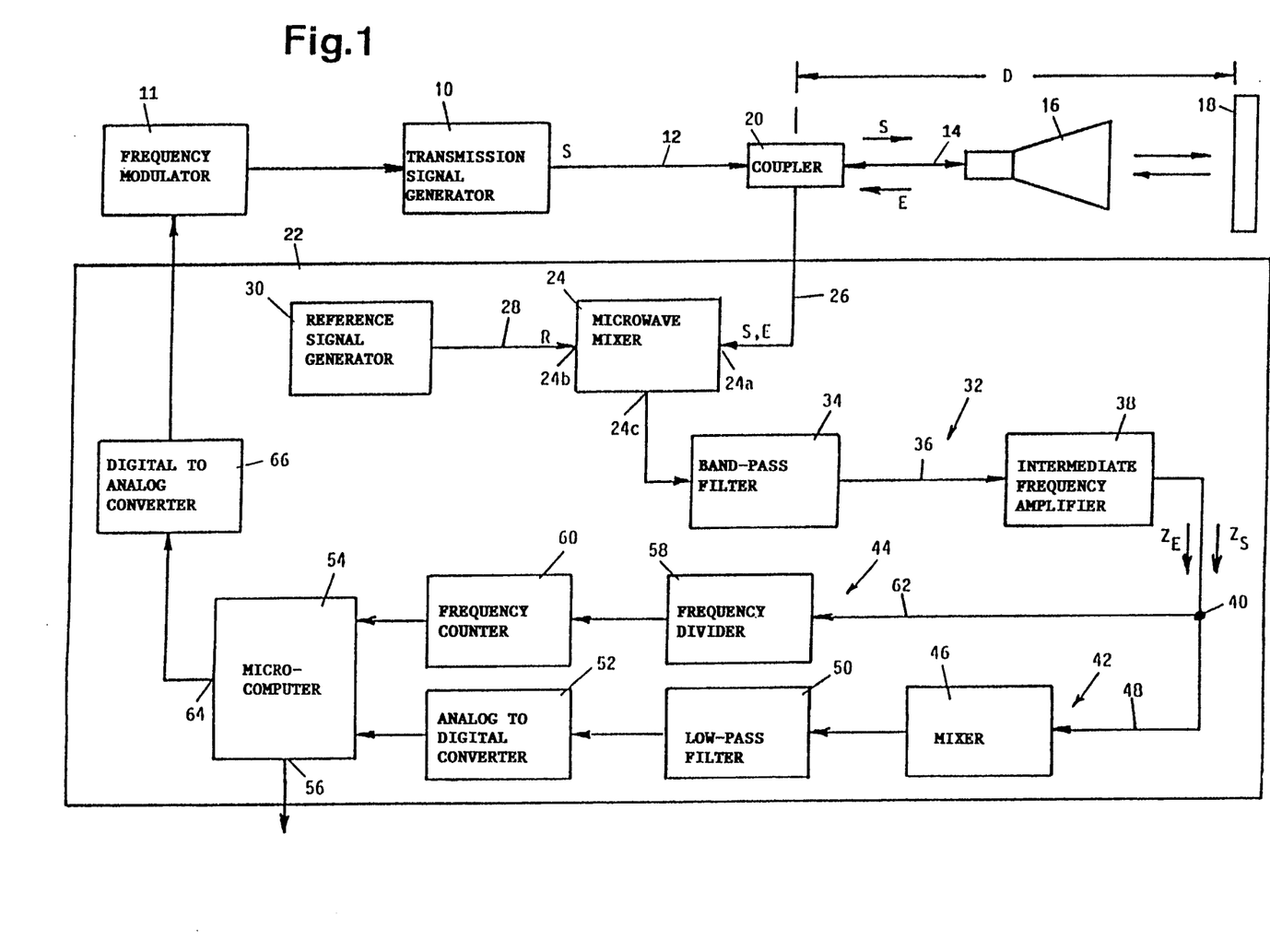
FIG. 1 is a block diagram of an arrangement for the measurement of distances using the reflected beam principle.

FIG. 1 of the drawing shows a transmission signal generator 10, which has a modulation input connected with a frequency modulator 11 and whose output is connected via lines 12 and 14 with an antenna 16. The transmission signal generator 10 produces a high frequency signal S at the frequency FS, which is supplied via the lines 12 and 14 to the antenna 16. The antenna 16 functions simultaneously as a transmission antenna and reception antenna; it radiates an electromagnetic transmission wave at the frequency $f_S$ of the transmission signal and receives the echo wave reflected at a target 18. On the basis of the received echo wave the antenna 16 returns a reception signal E at the frequency $f_E$ through the line 14.

By means of a coupler 20, which is arranged between the lines 12 and 14, a part of the transmission signal S and the reception signal E are separated. A signal processing circuit 22, connected with the coupler 20, and which will be described in the following, determines the transit time difference between the transmission signal S and the reception signal E and from this the distance D between the coupler 20 and the target 18.

Figure 2:
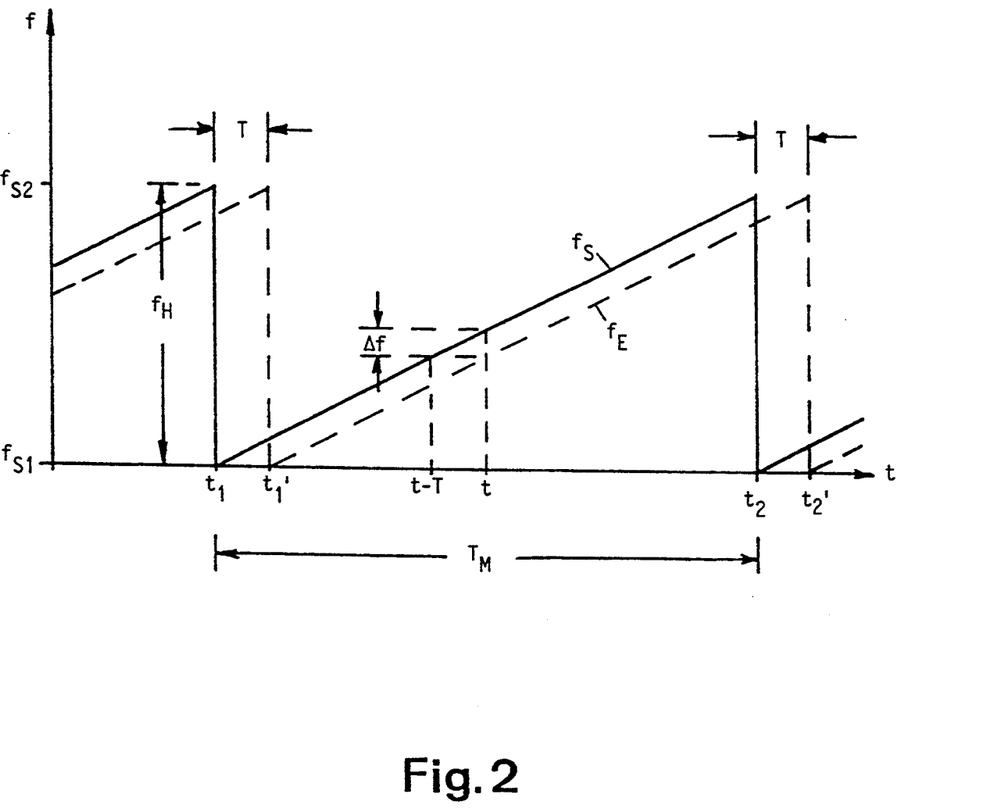
FIG. 2 is a diagram of the waveform of the transmission frequency and of the reception frequency in the case of the arrangement in accordance with FIG. 1.

In order for the signal processing circuit 22 to be able to determine the transit time difference between the transmission signal S and the reception signal E, the transmission signal produced by the transmission signal generator 10 is periodically frequency modulated by the frequency modulator 11, as depicted in the diagram of FIG. 2. As an example it is assumed that the transmission signal S is a continuous wave signal with a linear saw-tooth modulation with the result that the transmission frequency $f_S$ respectively has a lower value $f_{S1}$ at the instant $t_1$ of the start of each modulation period and an upper value $f_{S2}$ at the instant $t_2$ at the end of the each modulation period, and in the course of the modulation period will change between these two frequency values. The difference $$f_H = f_{S2} - f_{S1} \quad (1)$$

is the frequency excursion of the frequency modulation, and the duration $$T_M = t_2 - t_1 \quad (2)$$

is the modulation period of the frequency modulation. The transmission signal S consequently has a time-dependent frequency $f_S(t)$, which is defined within each modulation period $T_M$ by the following equation:

$$f_S(t) = f_{S1} + \frac{f_{S2} - f_{S1}}{T_M} \cdot (t - t_1) = f_{S1} + \frac{f_H}{T_M} \cdot (t - t_1) \quad (3)$$

The reception signal E has the same frequency values and the same frequency modulation as the transmission signal S, but it is however delayed at the location of the coupler 20 in relation to the transmitted signal S by a time T, which is equal to the transit time from the coupler 20 to the target 18 and back again. Therefore as related to the transmission frequency fS the reception frequency $f_E$ has, at the location of the coupler 20, the waveform as shown in broken lines in FIG. 2. Each modulation period of the reception signal E commences at an instant $t_1'$ which is delayed by the transit time T in relation to corresponding instant $t_1$ of the transmission signal S, and it terminates at a point in time $t_2'$, which is delayed by the transit time T in relation to the corresponding instant $t_2$ of the transmission signal S. The following relationships consequently hold:

$$t_1' = t_1 + T \text{ und } t_2' = t_2 + T \quad (4)$$

Accordingly at a given instant t the reception signal will have the frequency:

$$f_E(t) = f_{S1} + \frac{f_H}{T_M} \cdot (t - t_1') = f_{S1} + \frac{f_H}{T_M} \cdot (t - t_1 - T) \quad (5)$$

This frequency $f_E(t)$ is equal to the frequency $f_S(t-T)$, which the transmission signal S had at the instant t-T:

$$f_E(t) = f_S(t-T), \quad (6)$$

and it is lower by a value of $\Delta f$ than the frequency $f_S(t)$, which the transmission signal S had at the same instant t.

For the frequency difference $\Delta f$ we have from the equations (3) and (5):

$$\Delta f = f_S(t) - f_E(t) = f_S(t) - f_S(t - T) = \frac{f_H}{T_M} \cdot T \quad (7)$$

The terms $f_H$ and $t_M$ are predetermined set values of the frequency modulation, whereas the transit time T may have different values dependent on the target distance D. Between the transit time T and the distance D there is the following relationship:

$$T = 2 \cdot \frac{D}{c} \quad (8)$$

c being the speed of propagation of the electrical signals along the line 14 and of the electromagnetic waves in the free space between the antenna 16 and the target 18.

Conversely by measurement of the frequency difference $\Delta f$ it is possible to get the distance D. From the equations (7) and (8) it follows that:

$$\Delta f = \frac{f_H}{T_M} \cdot \frac{2D}{c} \quad (9)$$

$$D = \frac{c \cdot T_M}{2 \cdot f_H} \cdot \Delta f \quad (10)$$

As shown in FIG. 2 the distance frequency $\Delta f$ is constant over the entire range between the instants $t_1'$ and $t_2$ of each modulation period, if the frequency modulation is strictly linear. The range between the instants $t_1'$ and $t_2$ is the normally employed measurement range.

The signal processing circuit 22 connected with the coupler 20 is so designed that it renders possible an extremely exact measurement of the distance frequency $\Delta f$ and ensures a correction of the frequency modulation with little complexity.

The signal processing circuit 22 comprises a microwave mixer 24, whose one input 24a is connected via a line 26 with the output of the coupler 20. It is through this line that both a part of the transmission signal S and also the reception signal E are simultaneously supplied to one and the same common mixer. There is intentionally no decoupling of the two signals. The other input 24b of the microwave mixer 24 is connected via a line 28 with the output of a reference signal generator 30, which supplies a reference signal R with the constant reference frequency $f_R$. At the output 24c the microwave mixer 24 supplies not only the signals which are supplied to the inputs 24a and 24b, but furthermore intermediate frequency signals which are due to the mutual beat of the signals S, E and R at the inputs 24a and 24b. These intermediate frequency signals have frequencies, which correspond to the mixed products and thus also to the sums and the differences of the frequencies of the mutually modulated signals.

Figure 3A:
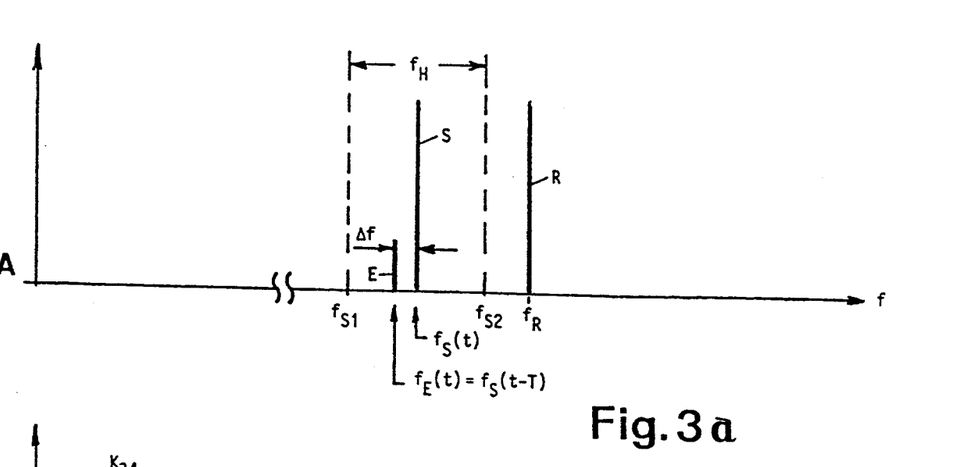
FIG. 3 shows diagrams of frequency spectra of signals taken from different points of the arrangement of FIG. 1
Figure 3B:
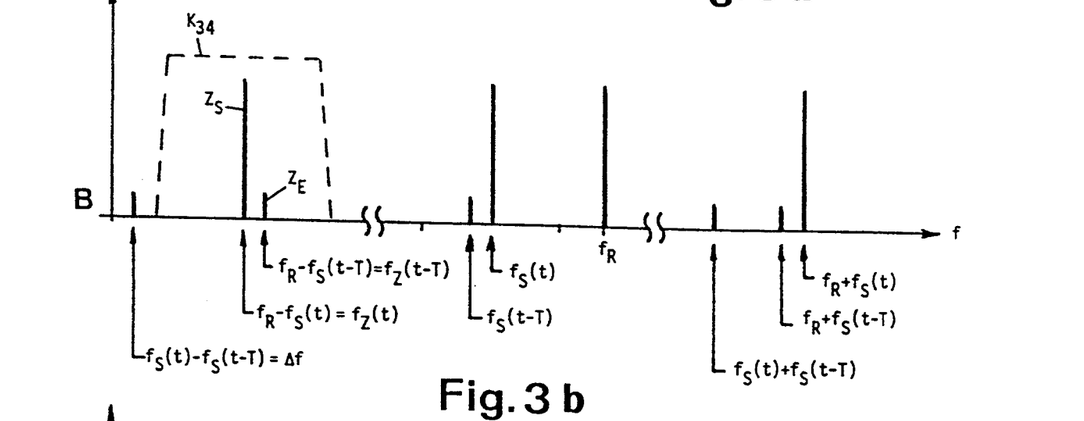
Figure 3C:
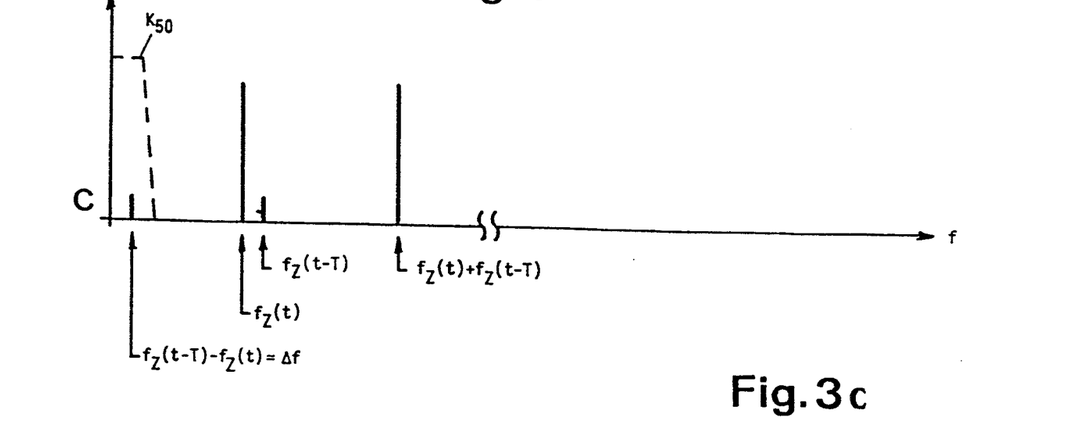

The diagram A in FIG. 3 shows the frequency spectrum of the signals, which are present at the inputs 24a and 24b of the microwave mixer 24. At the input 24a there is firstly the fraction separated by the coupler 20, of the transmission signal S, which has a substantial amplitude. The transmission signal S has the instantaneous frequency of $f_S(t)$, which owing to the frequency modulation varies in the frequency excursion existing between the frequencies $f_{S1}$ and $f_{S2}$. The diagram A shows the condition for the case illustrated in FIG. 2 that the instant t is exactly in the middle between the limits $t_1$ and $t_2$ of the frequency modulation period $T_M$.

Furthermore the reception signal E separated by the coupler 30 is present at the input 24a, which signal has a substantially smaller amplitude than the transmission signal S. The frequency $f_E(t)$ of the received signal E varies also within the frequency excursion range of frequency modulation, it having, within the greater part of this range, the value given by the equation (6), i.e.

$$f_E(t) = f_S(t-T)$$

which differs by the distance frequency $\Delta f$ from the frequency $f_S(t)$ existing at the same instant t. The frequency difference $\Delta f$ is exaggerated in size in the diagram A of FIG. 3 for clarity.

Finally the diagram A in FIG. 3 shows the frequency line of the reference signal R, which is present with a comparatively large amplitude at the input 24b of the microwave mixer 24. The frequency $f_R$ of the reference signal R is constant; it is so selected that it is above the highest frequency $f_{S2}$ of the frequency excursion range.

The diagram B of FIG. 3 shows the frequency sprectrum of the transmission/reception intermediate frequencies signal mixture at the output A of the microwave mixer 24. Besides the frequencies already illustrated in diagram A all the mixed products of these frequencies are present, that is to say the difference frequencies $$f_R - f_S(t)\ f_R - f_S(t-T)\ f_S(t) - f_S(t-T) = \Delta f \quad (11)$$

and the summated frequencies:

$$f_R + f_S(t)\ f_R + f_S(t-T)\ f_S(t) + f_S(t-T) \quad (12)$$

Between the difference frequencies $f_R - f_S(t)$ and $f_R - f_S(t-T)$ there is again the frequency difference of $\Delta f$, which corresponds to the distance frequency being sought. This distance frequency $\Delta f$ is also present at the output of the microwave mixer 24; but however it is not utilized at this point, because it has been produced directly by the formation of the difference between two very high and very closely adjacent frequencies and is consequently contains much noise. On the other hand the difference frequencies $f_R - f_S(t)$ and $f_R - f_S(t-T)$ are in an intermediate frequency range which is very suitable for further processing. The intermediate frequency:

$$f_Z(t) = f_R - f_S(t) \quad (13)$$

corresponds to the difference between the reference frequency and the transmission frequency and is for this reason termed the transmission intermediate frequency; the signal with this intermediate frequency is the transmission intermediate frequency signal $Z_S$. The intermediate frequency:

$$f_Z(t-T) = f_R - f_S(t-T) = f_R - f_E \quad (14)$$

corresponds to the difference between the reference frequency and the reception frequency and is for this reason termed the reception intermediate frequency; the signal with this intermediate frequency is the reception intermediate frequency signal $Z_E$.

At the output of the microwave mixer 24 an intermediate frequency channel 32 is connected, which comprises a band-pass filter 34, whose output is connected via a line 36 with the input of an intermediate frequency amplifier 38. The filter curve $K_{34}$ of the band-pass filter 34 is shown in broken lines in FIG. 3 in diagram B. It is so designed that the entire range of variation of the intermediate frequencies $f_Z(t)$ and $f_Z(t-T)$ is contained in the pass-range of the band-pass filter 34, whereas on the one hand the lower difference frequency $f_S(t) - f_S(t-T)$ and on the other hand the extremely high input frequencies $f_S$, $f_E$ and $f_R$ and furthermore the even higher summated frequencies are cut off. Therefore it is only the intermediate frequency signals $Z_S$ and $Z_E$ which are passed on to the low-noise intermediate frequency amplifier 38, at whose output they are available in an amplified form.

At the junction 40 following the output of the intermediate frequency amplifier 38 the signal path splits into two parallel channels 42 and 44. The channel 42 is the measurement channel, in which the distance frequency $\Delta f$ is obtained which is sought for the distance measurement. The channel 44 is a correction channel, which is utilized for linearizing the frequency modulation.

The measurement channel 42 comprises an intermediate frequency mixer 46, whose input is connected via a line 48 with the junction 40. In a similar manner to the microwave mixer 24 the intermediate frequency mixer 46 provides output signals which have the frequencies of the signals supplied to its input, and the mixed products, that is to say also the sums and differences of these frequencies. Because however the intermediate frequency signals supplied to the intermediate frequency mixer 46 have substantially lower frequencies, no microwave mixer is necessary for this intermediate frequency mixer and in fact it is sufficient to have a simple high frequency mixer.

The input signals of the intermediate frequency mixer 46 are the intermediate frequency signals $f_Z(t)$ and $f_Z(t-T)$ in accordance with the equations (18) and (19). Accordingly a signal mixture will appear at the output of the intermediate frequency mixer 46 with the frequency spectrum indicated in diagram C of FIG. 3, which mixture besides the intermediate frequencies $$f_Z(t) = f_R - f_S(t) \quad f_Z(t-T) = f_R f_S(t-T) \quad (15)$$

present at the input furthermore comprises the difference between these two intermediate frequencies $$f_Z(t-T) - f_Z(t) = \Delta f \quad (16)$$

and the sum of these two intermediate frequencies $$f_Z(t-T) + f_Z(t) \quad (17)$$

The signal with the difference frequency $\Delta f$ is the distance signal sought, whose frequency comprises the information concerning the distance D to be measured. This signal is well suited for evaluation, because it has been produced by the formation of the difference between two signals with comparatively low frequencies.

A low-pass filter 50 connected with the output of the intermediate frequency mixer 46 has the filter characteristic $K_{50}$ indicated shown in broken lines in the diagram C of FIG. 3. Such low-pass filter 50 lets through the distance frequency $\Delta f$, whereas it holds back the two intermediate frequencies $f_Z(t)$ and $f_Z(t-T)$ as well as the even higher summation frequencies.

At the output of the low-pass filter 50 an analog to digital converter 52 is connected, whose output is connected with an input of microcomputer 54. The analog to digital converter 52 converts the signal provided by the low-pass filter 50 with the distance frequency of $\Delta f$ into a digital signal suitable for processing in the microcomputer 54, for instance a train of pulses, whose repetition rate bears a fixed relationship to the distance frequency $\Delta f$. From this digital signal the microcomputer 54 determines the distance frequency $\Delta f$ and from it the distance D to be measured in accordance with the equation (13). At the output 56 it furnishes a signal, which indicates the value for the distance D.

As already mentioned, a substantial condition for the exact measurement of the distance D using the method as described in above is that the frequency modulation of the transmission - signal S is strictly linear. This condition is not complied with if either the modulation signal supplied by the frequency modulator 11 to the transmitted signal generator 10 fails to have the desired linearity, or if the transmitted signal generator 10 has inherent non-linearities which mean that the frequency of the transmitted signal S does not linearly follow the modulation signal. In the diagram A of FIG. 4 curve $f_{Ss}$ (the desired curve) indicates the prescribed linear waveform of the transmission frequency $f_S$ in the case of linear saw-tooth modulation as in FIG. 2, and the curve $f_{Si}$ (the actual curve) indicates in a highly exaggerated manner the actual waveform of the transmission frequency $f_S$ when there is non-linearity. For each instant $t_x$ within a modulation period $T_M$ the actual value $f_{Si}(t_x)$ departs from the desired value $f_{Ss}(t_x)$ by $D_x$, it being clear that the size of the departure $D_x$ changes during the modulation period $T_M$. The reception frequency $f_E$, which is not shown in FIG. 4 in order to make the drawing more straightforward, has the same non-linearity.

In order to cope with the non-linearity it is necessary for the modulation to be so corrected that the departures $D_x$ between the actual value curve $f_{Si}$ and the desired value curve $f_{Ss}$ disappear. This correction of the frequency modulation is implemented with the aid of the correction channel 44 connected at the circuit junction point 40 which contains a frequency divider 58 and a frequency counter 60. The input of the frequency divider 58 is connected by a line 62 with the junction 40. Therefore the frequency divider 58 gets the intermediate frequency signals $Z_S$ and $Z_E$ present at the output of the intermediate frequency amplifier 38.

For linearizing the frequency modulation only the transmission intermediate frequency signal $Z_S$ is utilized. For the separation of the signals the fact is taken advantage of that the transmission intermediate frequency signal $Z_S$, as is furthermore indicated in the diagram B of FIG. 3, has a substantially greater amplitude than the reception intermediate frequency signal $Z_E$. The frequency divider 58 is so designed that it only responds to the transmission intermediate frequency signal $Z_S$ with the greater amplitude. For this purpose it is possible to utilize a commercially available ECL component. The frequency divider 58 splits the frequency $f_Z(t)$ of the transmission intermediate frequency signal $Z_S$ down to a value, which allows counting in the frequency counter 60. By counting the periods with the divided-down frequency in a predetermined time interval it is possible to produce, for a given instant $t_x$, a count which characterizes the actual value of the transmission intermediate frequency $f_Z$ and therefore also the actual value $f_{Si}(t_x)$ of the transmission frequency $f_S$ at the instant $t_x$. The counts produced for different instants $t_x$ within a modulation period $T_M$ are supplied to a further input of the microcomputer 54. From such counts it is possible for the microcomputer 54 to ascertain the actual values of the transmission frequency $f_S$ for the different instants $t_x$, to determine the departures between the actual value curve and the desired value curve by comparison of such actual values with the desired values stored for the same instants or computed from time to time, and to compute correction values from such departures. On the basis of such correction values at a further output 64 a digital correction signal is supplied, which is converted in a digital to analog converter 66, connected with such input, into an analog signal, which is supplied to a control input of the frequency modulator 11 whereby the frequency modulation caused by the frequency modulator 11 is so changed that the departures are eliminated and therefore the frequency modulation is rendered linear.

Figure 4A:
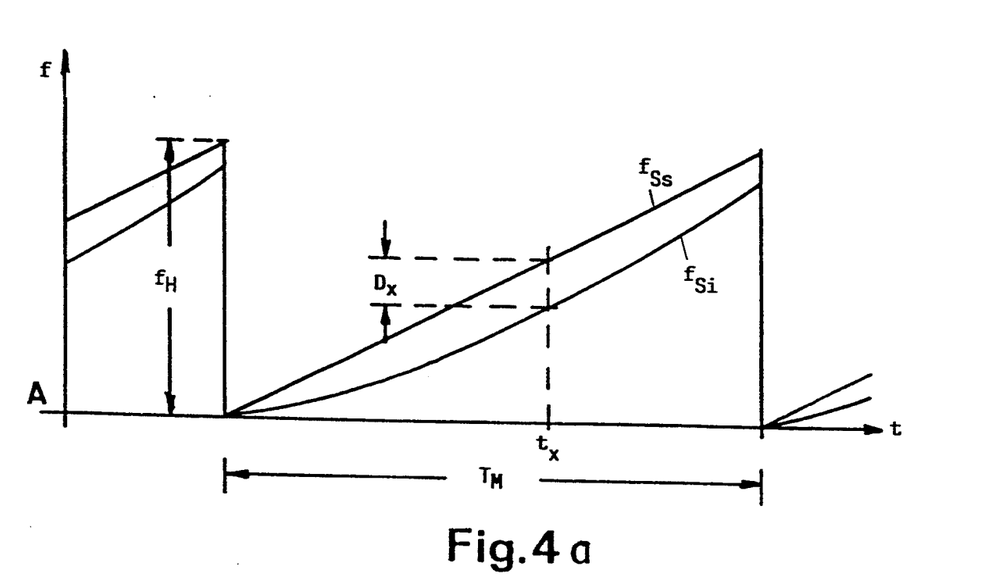
FIG. 4 shows diagrams in order to explain the frequency modulation correction implemented in the arrangement of FIG. 1.
Figure 4B:
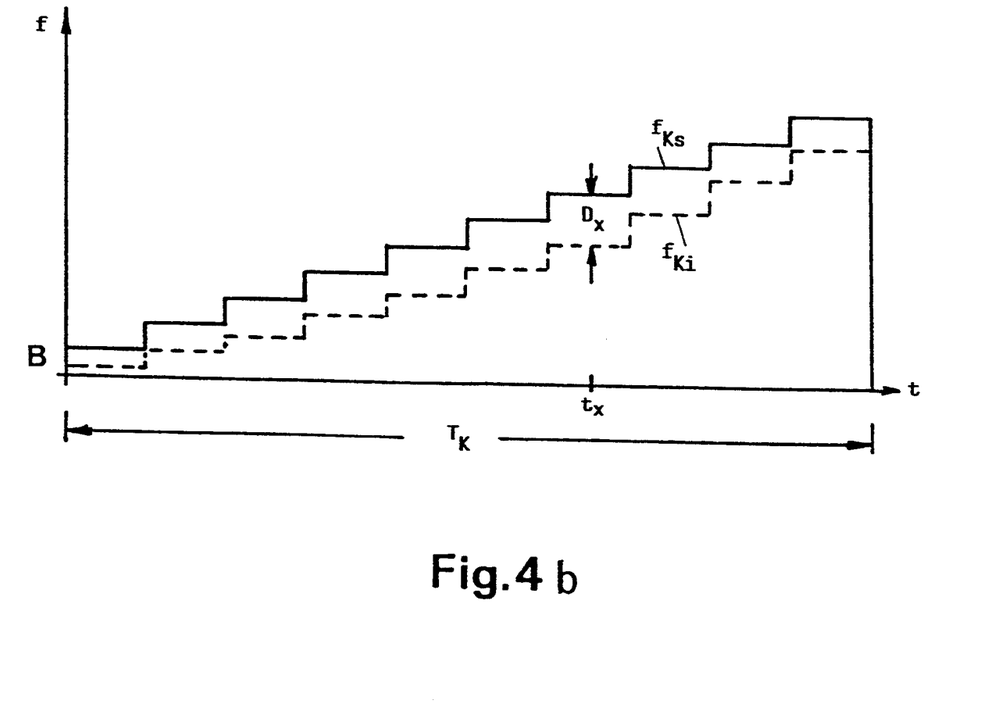

Since, if at all, the modulation characteristic of the transmitted signal generator 10 only changes very slowly, it is possible for the necessary correction values, after a first measurement of the frequency values, to be stored in the microcomputer 54, following which it is sufficient to check the stored values at longish intervals and if necessary to correct them. Each determination of the frequency value with the aid of the correction channel 44 preferably takes place in a calibration interval, in which there is no measurement of the distance D. In each calibration interval the transmission signal generator is supplied with a modulation signal, which prescribes a staircase modulation, as is illustrated in the diagram B of FIG. 4. Each step of the modulation signal corresponds to a predetermined desired value of the transmission frequency. The curve $f_{KS}$ in the diagram B of FIG. 4 is the desired curve in the calibration interval. In the correction channel 44 for each step the respective desired value of the transmission frequency is ascertained by counting the periods of the transmission intermediate frequency signal; from this the desired curve $f_{KI}$ in the calibration interval is obtained. By comparison of the actual values found with the predetermined desired values it is possible to determine the departure for each step and to compute and to store the corresponding correction value. The advantage of this modulation in steps is that the frequency does not change during the duration of each step, something that facilitates the exact measurement of the actual frequency by counting the periods. The duration $T_K$ of the calibration interval may be of any desired length, more particularly it may be substantially longer than the duration $T_M$ of the modulation period; it is made so large that the duration of each step is sufficiently large in order to be able to count the number, corresponding to the necessary accuracy, of periods of the transmission intermediate frequency. The calculation of a limited number of correction values in the frequency excursion range is sufficient, because any necessary intermediate values can be produced by linear interpolation.

When in this manner the step values of the modulation characteristic or, respectively, the correction values for the entire frequency range have been stored in the microcomputer 54, the measurement of the distance D can be resumed, the microcomputer being able to supply the correction signal necessary for the corrected frequency modulation, to the control input of the frequency modulator 11.

During the measurement intervals, in which the measurement of the distance D takes place, the circuit components 24, 30, 34, 38, 46, 50 and 52 therefore constitute a measuring circuit, in which the distance frequency $\Delta f$ is determined and is utilized for determining the distance D. In this respect the very high frequency transmission and reception signals are converted with the aid of the reference frequency $f_R$ to the intermediate frequency signals with lower frequencies, which are simple to process and from which then more particularly the distance frequency $\Delta f$ can be obtained more exactly and with a better signal to noise ratio. During the calibration intervals there is a reference circuit, which uses the same components 24, 30, 34 and 38 as the measurement circuit, it only branching at the junction 40 from the measurement circuit, only the frequency divider 58 and the frequency divider 60 being present in the correction channel 44. Owing to the considerable double use of the circuit components the circuit structure is simpler with a smaller number of components. In particular no circulator is necessary for realizing of the circuit, and the other microwave components are only a coupler and a microwave mixer, which are utilized both in the measuring circuit and in the reference circuit. Owing to this simple design the circuit is particularly suitable for manufacture as a monolithic integrated circuit.

The above described correction of the frequency modulation by means of the correction channel 44 can be employed in the same manner, if in lieu of the above mentioned linear saw-tooth modulation described as an example, some other form of linear frequency modulation is employed, for example symmetrical or non-symmetrical triangular modulation or furthermore non-linear frequency modulation, for instance logarithmic frequency modulation.

It is naturally possible for modifications to be implemented in the working embodiment described in the above, which are familiar to those skilled in the art. Thus for instance instead of a periodically frequency modulated continuous wave signal the transmitted signal generator 10 may also produce frequency modulated pulses, the pulse duration being equal to the modulation period. The frequency modulator 11 may furthermore be integrated in the microprocessor 54, which in this case will provide the corrected modulation signal in a digital form at the output 64, such signal then being supplied after conversion in the digital to analog converter 66 to the modulation input of the transmission signal generator 10.

The circuit arrangement described may also be used if, in lieu of the common transmission and reception antenna depicted in FIG. 1, two antennas are utilized, of which the one would operate as a transmission antenna and the other as an reception antenna. The transmission antenna would then be connected in the same manner as the antenna 16 in FIG. 1; it is merely necessary to supply the received signal from the reception antenna in a suitable manner to the microwave mixer 24.

Finally the described circuit arrangement is not limited to use in equipment for the transmission and reception of electromagnetic radiation; it is also suitable for equipment designed for the transmission and reception of ultrasonic radiation, i. e. using the sonar principle. The only departure from the above mentioned working embodiment is then that the antenna would comprise an electroacoustic transducer, which converts the electrical transmission signal produced by the transmission signal generator into an ultrasonic wave, and which converts the ultrasonic echo wave reflected by the target into an electrical reception signal, which would be separated by the coupler. The manner of operation of the signal processing circuit 22 would not be affected by this modification.

We claim:

1. A method for measuring distances using the reflected beam principle comprising the steps of transmitting at a target a frequency modulated transmission signal having a transmission frequency, receiving from the target a reception signal having a reception frequency, converting the transmission frequency to a transmission intermediate frequency using a constant reference frequency, using the transmission intermediate frequency to correct the frequency modulation of the transmission frequency, converting the reception frequency to a reception intermediate frequency using the constant reference frequency, determining the frequency difference between the transmission intermediate frequency and the reception intermediate frequency, determining the frequency difference between the transmission and reception frequencies from the frequency difference between the transmission intermediate frequency and the reception intermediate frequency as a measure of distance.

2. The method of claim 1, further comprising the step of determining actual values of the transmission intermediate frequency for different desired values of the transmission frequency within a frequency range to determine actual values of the transmission frequency, comparing the actual values of the transmission frequency with the corresponding desired values of the transmission frequency, and modifying the frequency modulation of the transmission frequency in order to eliminate the difference between actual values of the transmission frequency and desired values of the transmission frequency.

3. The method of claim 2, wherein the step of determining the actual values of the transmission intermediate frequency and the step of comparing the actual and desired values of the transmission frequency take place in calibration intervals spaced from each other in time, and further comprising the step of storing correction values for eliminating the difference between actual and desired values of the transmission frequency and using the correction values in periods between the calibration intervals in order to correct the frequency modulation.

4. The method of claim 3, wherein the transmission frequency is modulated in steps during the calibration interval and for each modulation step the correction value for eliminating the difference between the actual and desired values of the transmission frequency is determined and stored.

5. The method of claim 4, wherein for each modulation step the actual value of the transmission intermediate frequency is determined by counting the periods of the transmission intermediate frequency.

6. The method of claim 5, wherein the transmission intermediate frequency is reduced by frequency division prior to counting the periods of the transmission intermediate frequency.

7. An apparatus for measuring distance on the basis of the reflected beam principle comprising a transmission signal generator for the production of a frequency modulated transmission signal having a transmission frequency, at least one antenna for the transmission of a wave at the transmission frequency and for the reception of an echo wave having a reception frequency, a reference signal generator for the production of a reference signal with a constant reference frequency, a mixer which receives one signal at the transmission frequency, one signal at the reception frequency and the reference signal and produces as an output a transmission intermediate frequency and a reception intermediate frequency, a measuring channel connected to the output of the mixer for determining a distance frequency between the transmission frequency and the reception frequency from the frequency difference between the transmission intermediate frequency and the reception intermediate frequency as a measure of distance, and a correction channel connected to the output of the mixer and parallel to the measuring channel, wherein the transmission intermediate frequency is utilized for correction of the frequency modulation of the transmission frequency.

8. The apparatus of claim 7, wherein the correction channel includes a frequency counter for counting the periods of the transmission intermediate frequency, and further comprising a microcomputer which determines an actual value of the transmission frequency from each count, compares each actual value with a desired value and from the result of the comparison calculates correction values for the correction of the frequency modulation of the transmission frequency.

9. The apparatus of claim 8, wherein the microcomputer includes a memory for storing the calculated correction values and uses the stored correction values until new correction values are computed for the correction of the frequency modulation of the transmission signal.

10. The apparatus of claim 8, further comprising a frequency divider connected to the input of the frequency counter wherein the frequency divider divides the transmission intermediate frequency down to a value which renders possible counting in the frequency counter.

11. The apparatus of claim 10, wherein the output of the mixer is connected to a band-pass filter, which only allows the passage of frequencies in a range which includes the transmission intermediate frequency and the reception intermediate frequency, the transmission intermediate frequency signal has a larger amplitude than the reception intermediate frequency signal, and the frequency divider responds to the transmission intermediate frequency signal with the greater amplitude.

12. The apparatus of claim 9, further comprising a frequency divider connected to the input of the frequency counter wherein the frequency divider divides the transmission intermediate frequency down to a value which renders possible counting in the frequency counter.

* * * * *